Jan. 17, 1967  D. E. WOLFORD  3,298,608
METHOD FOR SPRAYING
Original Filed July 20, 1964  2 Sheets-Sheet 1
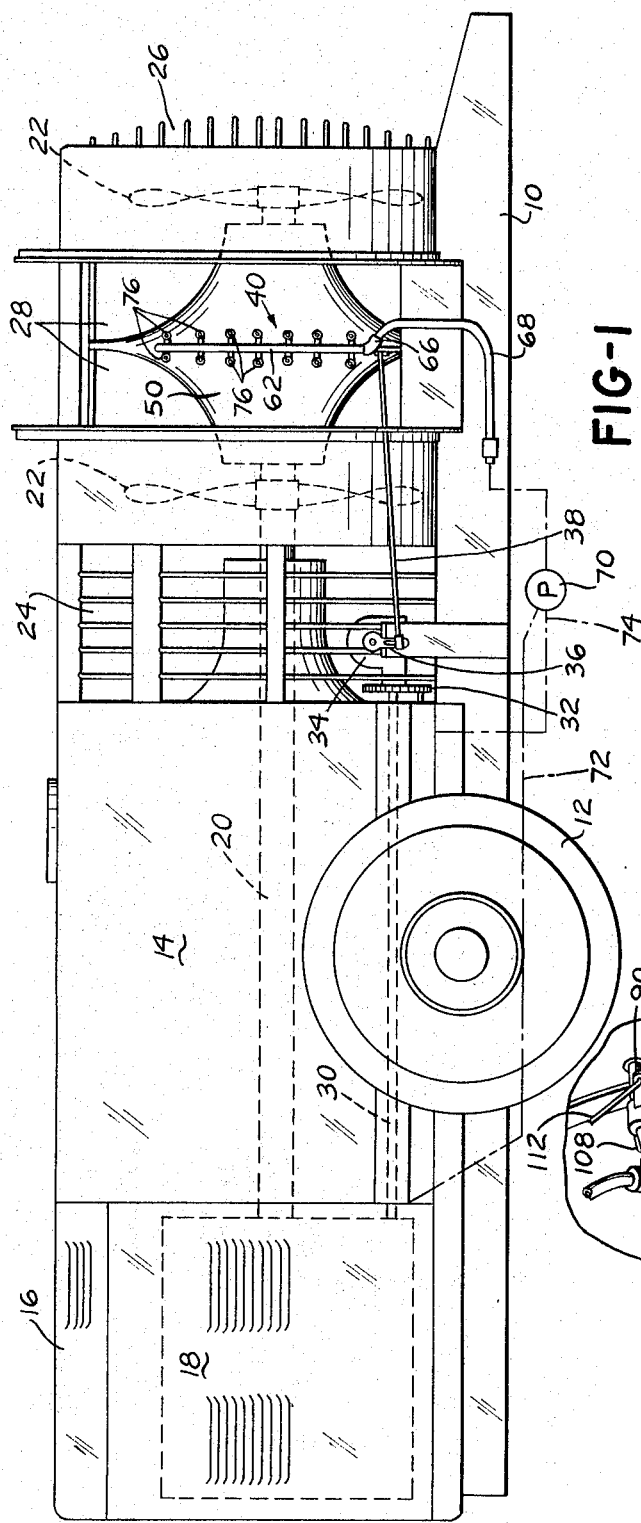
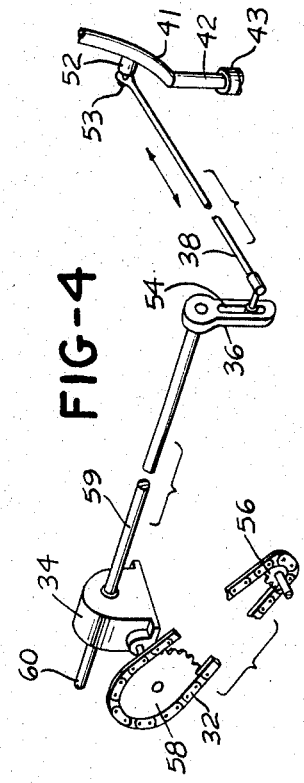
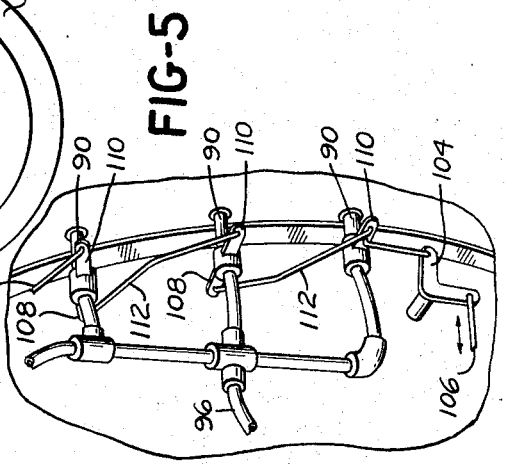
INVENTOR.
DALE E. WOLFORD
BY

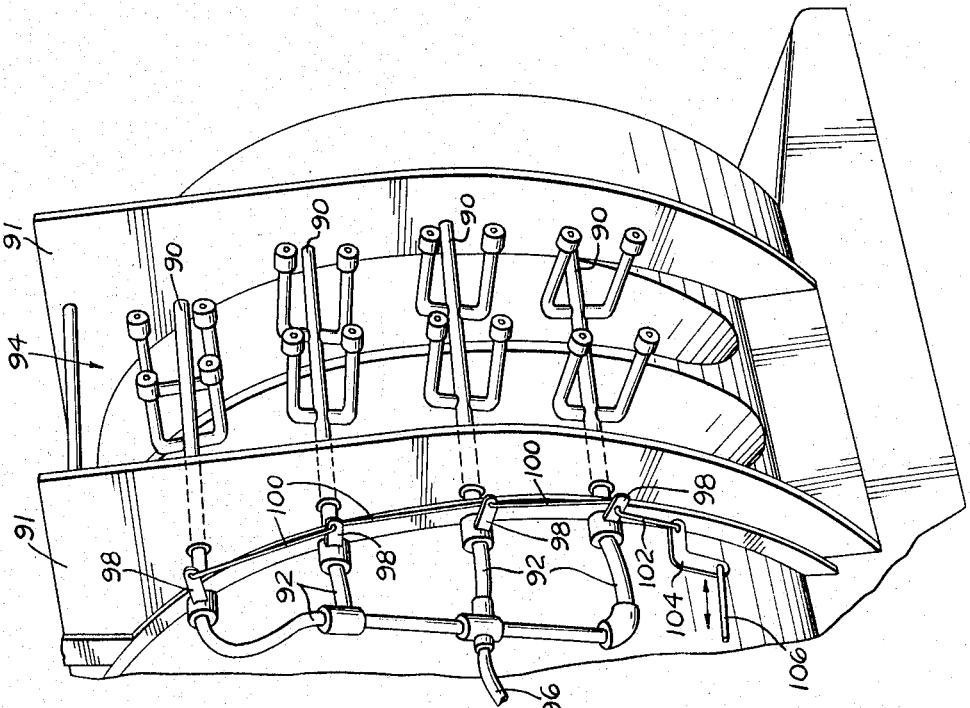
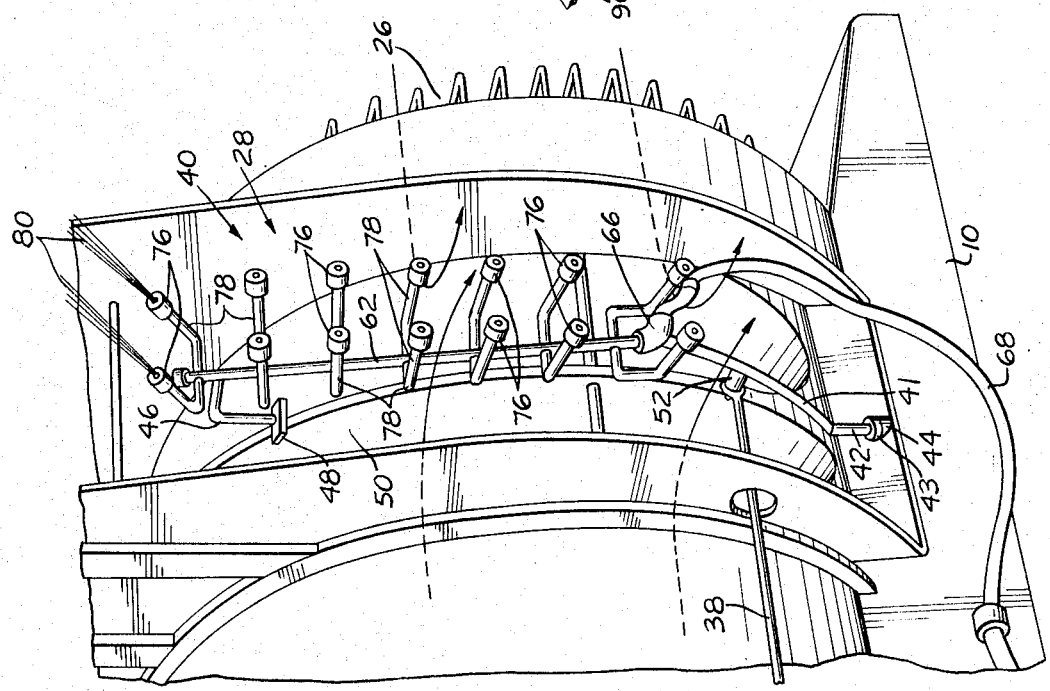
INVENTOR.
DALE E. WOLFORD

United States Patent Office 3,298,608
Patented Jan. 17, 1967

3,298,608
METHOD FOR SPRAYING
Dale E. Wolford, Ashland, Ohio, assignor to the F. E. Myers & Bro. Co., Ashland, Ohio, a corporation of Ohio
Original application July 20, 1964, Ser. No. 383,605. Divided and this application Apr. 1, 1966, Ser. No. 539,423
6 Claims. (Cl. 239—8)

The present invention relates to spraying, particularly with respect to the spraying of insecticides and fungicides and other liquid chemical treatment materials on or in the region of vegetation, such as trees and the like. This application is a division of my copending application, Serial No. 383,605, filed July 20, 1964, entitled, Method and Apparatus for Spraying.

The spraying of liquid materials on vegetation such as trees and the like, of course, is well known and is commonly accomplished by directing an air blast toward the region to be treated and entraining in the air blast the liquid treatment material in the form of droplets that are introduced into the air stream by being sprayed therein from nozzles.

While this arrangement is generally satisfactory for conveying treatment material to plants and for distributing it thereon, it has certain practical limitations that have not heretofore been overcome. In my co-pending application Serial No. 205,752, filed June 27, 1962, and entitled, "Method of Spraying," there is disclosed an arrangement for improving the effectiveness and efficiency of spraying operation of this nature. In brief, my prior application is concerned with the introduction into the air blast of the liquid treatment material in the form of a fine spray projected into the air blast in the direction of movement thereof and at no less than the same velocity as the air blast and preferably, at a velocity slightly greater than that of the air blast.

The effect of introducing the liquid treatment material in this manner is that a much higher degree of efficiency results because the air stream does not have to pick up and accelerate the treatment material, and it becomes possible to move much more air with a given horsepower and to direct the air stream in a better manner.

The present invention is concerned with a further extension of the inventive thought of the prior application mentioned above and is also a further improvement on my co-pending application, Serial No. 250,176, filed January 8, 1963.

The present invention particularly relates to a method for injecting liquid spray material into an air stream while varying the direction of the liquid being sprayed into the air stream without changing the direction of the air stream itself.

This results in greatly improved efficiency of the spraying device with respect to the direction of the spray material laden air and the uniform distribution of the spray material in the air blast, and makes the spraying device highly effective for certain classes of use. For example, in the spraying of trees in an orchard, the spraying device is moved between rows of the trees and thus will be in the condition of approaching each tree, being beside each tree, and moving beyond each tree. The opportunity is thus presented of delivering spray material to substantially 180° of the periphery of the tree during this movement of the spraying device in a straight line provided the air blast from the spraying device can be directed in the proper manner and provided further that the liquid treatment material is properly entrained in the air blast in a uniformly distributed manner.

This is accomplished in brief by oscillating the nozzles from which the liquid spray emerges. The nozzles are located in a discharge air stream and are oscillated one or more times during the interval that the spraying device passes a given point such as the center of a tree. A spraying device of this nature not only treats substantially half the tree in one pass but also treats it at different angles at which the spray material is delivered to the tree to effect a thorough although not violent agitation of the foliage of the tree and thus provides for a complete treatment thereof including the branches of the tree.

With the foregoing in mind, a primary object of the present invention is the provision of a greatly improved method for spraying which results in more efficient operation of the apparatus and more uniform and effective distribution of the spraying material.

Another object of the present invention is the provision of a method of spraying with an air blast spraying device which includes oscillating the liquid discharge nozzles which are located in the air blast and which nozzles discharge the liquid in the general direction of the air blast to create a turbulence in the air blast and to uniformly distribute the liquid treatment material in the air blast.

The foregoing objects and advantages as well as other objects and advantages of the present invention will become more apparent upon reference to the following specification, taken in connection with the accompanying drawings, in which:

FIGURE 1 is a side elevational view of a spraying device for the practice of the present invention and including parts somewhat diagrammatically illustrated;

FIGURE 2 is a perspective view of the discharge end of the spraying device showing a swingable nozzle discharge manifold disposed within the discharge opening of the device and wherein the nozzles swing horizontally;

FIGURE 3 is a view like FIGURE 2 but showing a modification wherein the nozzles swing vertically;

FIGURE 4 is a somewhat diagrammatic perspective view showing the actuating mechanism on one side of the machine for causing swinging movement of the swingable manifold on that particular side of the spraying device; and FIGURE 5 is a perspective view similar to FIGURE 3 showing another modification in which adjacent ones of said discharge nozzles oscillate in respectively opposite direction.

Referring to the drawings somewhat more in detail, FIGURE 1 shows a spraying apparatus in which there is a chassis 10 having supporting wheels 12 so that the spraying device can be drawn over the ground. On chassis 10 is a tank 14 for receiving the liquid material to be sprayed from the device.

To the left end of the spraying device, as is viewed in FIGURE 1, is an engine department 16 in which there is an engine 18 indicated diagrammatically in dot-dash outline. This engine drives a shaft 20 that extends through a tube in tank 14 completely through the tank to the right or rear end of the spraying device where the said shaft is connected with the propeller type air impellers 22. These propellers draw air inwardly through the air inlets 24 and 26 and this air is blown out laterally from the spraying device through the laterally directed opening 28. This opening may extend completely around the upper portion of the spraying device or it may consist of lateral openings on the sides only, or there may be provided deflector blades toward the top of the opening for confining the air blast to a generally lateral and somewhat upwardly inclined region.

The engine 18 is also arranged to drive another shaft 30 extending into the tank and having elements thereon (not shown) for maintaining the liquid treatment material in the tank agitated so that this material is uniform throughout the tank. The shaft 30 at its end opposite motor 18 drives, by means of chain 32, the output shaft of a speed reducer 34 that has a crank 36 on its output shaft connected by a rotary joint with an oscillating drag link 38.

A particular feature of the present invention resides in the provision of a swinging manifold means 40 in the discharge opening 28 at each side of the spraying device. This manifold means 40 is best seen in FIGURE 2 wherein it is seen to comprise a manifold pipe 62 having a support member 41 fixed thereto at the lower end thereof. The support member 41 has the general arcuate shape shown and is fixed at its lower end to pivot shaft 42 which is rotatably received in block 44 which is fixed to chassis 10. The upper end of manifold pipe 62 is fixed to a generally L shaped support member 46 which has the free end thereof rotatably mounted in pivot block 48 which is fixed to the deflector structure 50 centrally located in the spraying device in the plane of the discharge opening 28. Standard locking collar 43 on pivot shaft 42 is used to adjust and fix the location of manifold means 40 in the support blocks.

There is a link 52 which is threaded at one end and which is secured to support member 41 at the other end. One end of oscillating drag link 38 is pivotally connected to link 52 and is secured thereon by a nut 53. It will be appreciated that oscillation of the drag link will cause swinging movement of manifold means 40 about its pivotal supports. The actuating mechanism and the connection thereof between the speed reducer 34 and the manifold means 40 will be seen in FIGURE 4. This figure will also reveal that crank arm 36 has a slot 54 therein in which the end of the drag link 38 can be adjusted thereby to change the angle through which the manifold means 40 will swing.

The speed with which the manifold means 40 oscillates can readily be adjusted by changing the sprockets 56 and 58 which form the driving and driven sprockets respectively that connect the input shaft of speed reducer 34 with the agitator shaft 30. It will be understood that there is generally provided manifold means 40 on each side of the machine, and in order to actuate the means on the opposite side of the machine, the output shaft 59 of the speed reducer 34 could extend out the other side thereof as indicated at 60 in FIGURE 4, thereby providing for a crank 36 on each side of the spraying device.

Another particular feature of the present invention resides in the arrangement for supplying spray material to the air blast that leaves the discharge opening 28 of the spraying device. As will be seen in FIGURES 1 and 2 manifold means 40 has a manifold pipe 62 as shown. This manifold pipe is closed at its upper end, and at its lower end is connected with a fitting such as the elbow 66 to which therein is connected a flexible high pressure supply hose 68 leading to the discharge side of a relatively high pressure pump 70 that is arranged for being driven by engine 18, as indicated diagrammatically at 72. The suction side of pump 70 is connected by conduit 74 with tank 14. The flexible hose will supply the liquid treatment material to manifold 62 but will not interfere with the movement of manifold means 40.

The manifold has connected thereto a plurality of spray nozzle elements 76, each connected to the manifold by an angular conduit 78. The spray material supplied under pressure to manifold 62 thus passes through conduit 78 to nozzles 76 and is atomized therein and is projected into the air blast from each nozzle in the form of the conical spray 80. According to the present invention, the velocity of each spray is at least equal to the velocity of the air blast so that little energy, if any, is taken from the air blast to accelerate the spray material and to carry it along with the air blast. The conical spray 80, however, insures that the spray material will be uniformly distributed in the air blast.

The movement of the nozzles 76 with the manifold means 40 is more effective to fill the air discharged from the machine which is effective in providing a uniform treatment of the liquid spray material on the vegetation being treated.

As will be seen in FIGURE 2, the nozzles 76 are arranged on both sides of the manifold pipe 62 as shown. The manifold means on the opposite side of the spraying device is arranged in the same manner as the one described above.

FIGURE 3 shows a slightly different arrangement in which the manifold means are oscillated on a horizontal axis instead of a vertical axis.

In FIGURE 3 there is a plurality of manifold pipes 90 which are rotatably mounted in side members 91 as shown. Each of the pipes 90 has connected thereto a flexible manifold 92 which is connected to another flexible manifold member 96. Each of the pipes 90 has nozzle assemblies generally indicated at 94 through which the treatment liquid is discharged. The pipes 90 each have an arm 98 thereon which are connected together by links 100 in order to move the arms 98 in unison.

To the lowermost arm is connected the link 102 that is attached to one end of a crank lever 104, the other end of which is connected with drag link 106 that corresponds to drag link 38 of the first described modification.

The vertical oscillation of the nozzles in accordance with the FIGURE 3 arrangement has proved to be highly effective for the agitation of the foliage of the vegetation being treated, and in most cases, the effectiveness of the treatment of vegetation is as good for the FIGURE 3 modification as it is for the FIGURE 2 modification. Both modifications are characterized by the employment of swingable nozzle means so as to more effectively fill the air stream with treatment liquid with the result of more effective coverage of the vegetation being treated.

FIGURE 5 shows another modification which is similar to the construction of FIGURE 3 except adjacent manifold pipes 30 are made to rotate in respectively opposite directions through a modified form of linkage.

In FIGURE 5 each of the pipes 90 has two arms 108 and 110 connected thereto at 180° apart. One of the arms 108 is connected to arm 110 of the adjacent pipe 90 by a curved link 112 as shown, so that the adjacent pipes 90 will rotate in opposite directions. Flexible manifold pipes 92 can be made long enough to permit flexing and rotation thereof when the pipes 90 are rotated in opposite directions. This modification produces an exceptional amount of turbulence in the air stream which is effective for spraying the foliage.

As has been brought out in my previous application, the weight of liquid spray material may be about ⅙ of the weight of the air moving through the discharge opening so that a substantial amount of energy is realized by injecting the spray material in accordance with the present invention.

With respect to particular values that might be encountered, the air velocity of 90 m.p.h. is not unusual with spray equipment of the nature disclosed. The liquid material from the nozzles is moved at a velocity preferably 10 to 20% higher than the air velocity. The pressures employed for obtaining good atomization of the liquid, while at the same time developing the proper velocity thereof, will run from about 117 pounds per square inch on the liquid to about 200 pounds per square inch. At pressures above 200 pounds per square inch there appears to be little gain in machine performance. This is due to the logarithmic function of nozzle performance, whereby a unit increase in pressure produces a diminishing unit increase in velocity at the nozzle orifice.

Overall optimum machine performance is attained when the liquid material from the nozzles is introduced at a velocity 10% to 20% higher than the air velocity. Pressures higher than those required to produce this liquid velocity and the desired atomization are reflected by large increases in power required with only slight gain in machine performance.

It will be understood that this invention is susceptible to modification in order to adapt it to different usages and conditions and accordingly, it is desired to comprehend such modifications within this invention as may fall within the scope of the appended claims.

What is claimed is:

1. A method of applying treatment liquid to vegetation which comprises; generating an air blast, confining the air blast to a predetermined cross section and directing the thus confined air blast in a predetermined direction toward the vegetation to be treated, injecting treatment liquid into said air blast in the form of a spraying at spaced points distributed over the cross section of said air blast so the air blast carries the injected liquid to the vegetation, and cyclically changing the location of said points in said air blast to cause agitation of said vegetation to promote complete treatment thereof without change of direction of said air blast.

2. The method according to claim 1 in which all of said points are moved in one and the same direction in said air blast at the same time.

3. The method according to claim 1 in which adjacent groups of said points are moved in respectively opposite directions in said air blast at the same time.

4. The method according to claim 1 in which the said treatment liquid is injected into said air blast at substantially the same velocity as said air blast.

5. The method according to claim 1 in which said liquid is injected into the air stream in atomized form.

6. The method according to claim 2 in which said points are distributed in a region narrower than the dimension of the air blast in a first direction and extending across the air blast in a second direction at right angles to said first direction, said points moving in said air blast in said first direction.

References Cited by the Examiner
UNITED STATES PATENTS

| | | | |
|---|---|---|---|
| 2,583,753 | 1/1952 | Spreng et al. | 239—78 |
| 2,643,155 | 6/1953 | Wright et al. | 239—78 |
| 3,009,644 | 11/1961 | Meadowcraft et al. | 239—78 |
| 3,088,676 | 5/1963 | Nottingham | 239—78 |

EVERETT W. KIRBY, *Primary Examiner.*